UNITED STATES PATENT OFFICE.

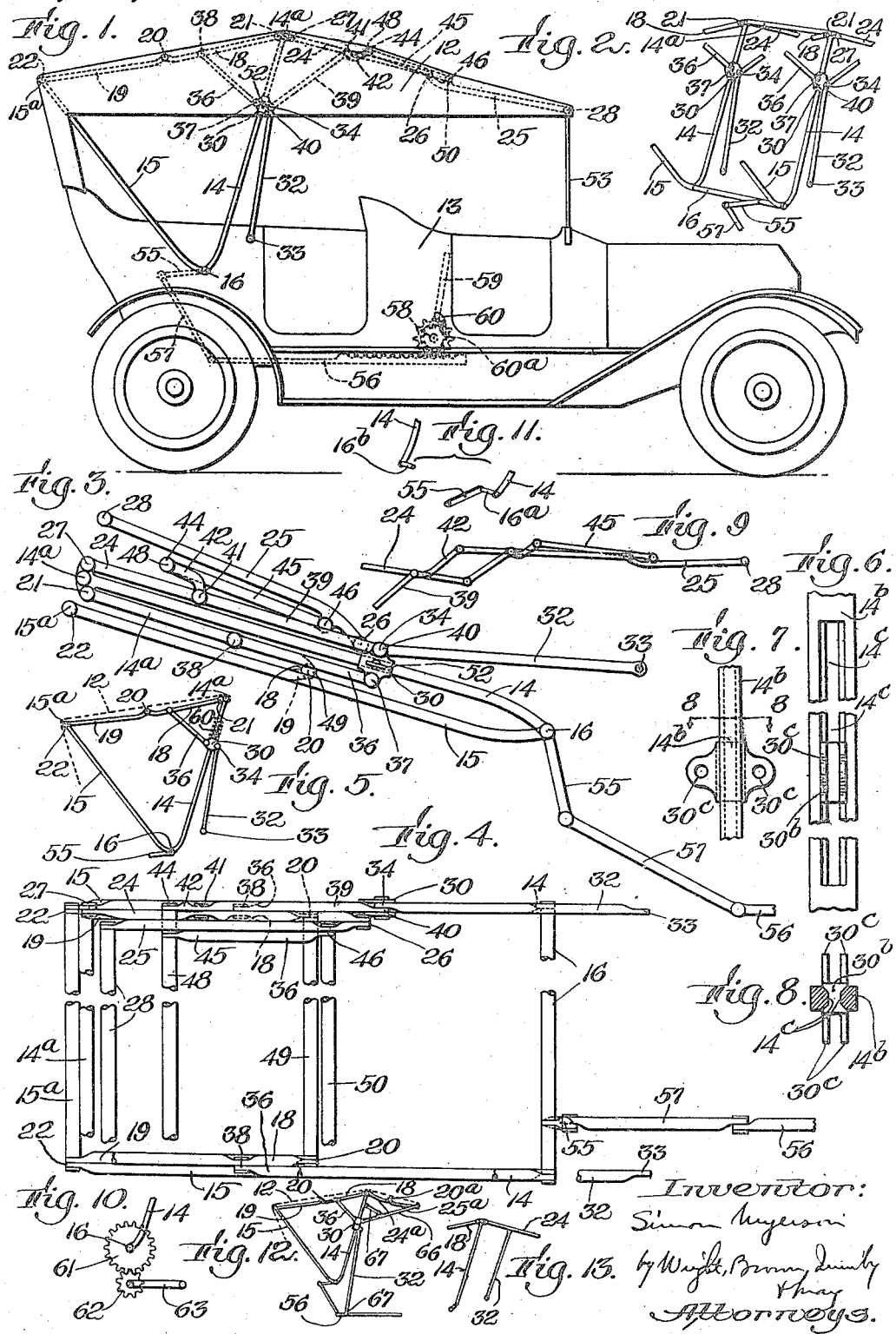
S. MYERSON.
TOP FOR VEHICLE BODIES.
APPLICATION FILED OCT. 5, 1916.
1,247,315. Patented Nov. 20, 1917.

SIMON MYERSON, OF CAMBRIDGE, MASSACHUSETTS.

TOP FOR VEHICLE-BODIES.

1,247,315.

Specification of Letters Patent.   Patented Nov. 20, 1917.

Application filed October 5, 1916. Serial No. 123,854.

*To all whom it may concern:*

Be it known that I, SIMON MYERSON, a citizen of the United States, residing at Cambridge, in the county of Middlesex and State of Massachusetts, have invented new and useful Improvements in Tops for Vehicle-Bodies, of which the following is a specification.

This invention relates to tops adapted to be erected above the bodies of automobiles and other vehicles to shelter the occupants and folded behind the seating space when shelter is not required.

The invention has for its object to provide a top of simple and durable construction adapted to be quickly erected and folded either by power exerted by the motor of an automobile, or by a chauffeur or other operator, and in the latter case with so little muscular effort that one man may easily erect and fold the top, the erection and folding of the top being largely automatic and involving only the swinging movement of a bow by the operator.

The invention is embodied in the improvements which I will now proceed to describe and claim.

Of the accompanying drawings, forming a part of this specification,—

Figure 1 represents a side elevation of an automobile having a top embodying the invention.

Fig. 2 represents a fragmentary perspective view showing portions of the frame of my improved top without the flexible cover.

Fig. 3 represents an edge view showing the frame folded, the cover being removed.

Fig. 4 represents a plan view of the frame as shown by Fig. 3, parts being broken away.

Fig. 5 represents a side view showing the frame without the forwardly extended top portion shown by Fig. 1.

Fig. 6 represents a fragmentary side view of a portion of one of the frame bows showing a modified form thereof.

Fig. 7 represents an edge view of the portion shown by Fig. 6.

Fig. 8 represents a section on the line 8—8 of Fig. 7.

Fig. 9 represents a modified form of the extended top portion of the frame.

Fig. 10 represents an alternative form of means for applying power to one of the bows.

Fig. 11 represents a view similar to a portion of Fig. 2, showing a modification.

Fig. 12 represents a view similar to a portion of Fig. 5, showing a relatively short forwardly-extending frame-top portion.

Fig. 13 represents a view similar to a portion of Fig. 1, omitting the runners hereinafter described.

The same reference characters indicate the same parts in all of the figures.

12 represents a flexible cover which may be of any suitable form and construction and may be connected as usual at its rear end with the rear end of a vehicle body 13. The frame, which supports said cover and is adapted to be erected with the cover above the body and folded with the cover behind the seating space of the body, includes a front or primary bow and a rear or secondary bow, these being pivoted at their lower ends to the body. As shown by Figs. 2 and 4, the front bow may consist of two side or standard portions 14 and a neck portion 14ª connecting the outer ends of the side portions. The pivotal connection between the lower ends of the side portions 14 and the body 13 may be provided by a rock shaft 16 rigidly attached to the portions 14 and journaled in bearings in the sides of the body, said rock shaft preferably constituting an element of means provided for swinging the front bow to erect and fold the frame and cover. In case a rock shaft extending continuously across the body is objectionable, the portions 14 may be independently pivoted to the body as by trunnions 16ª and 16ᵇ as shown by Fig. 11.

The rear bow may consist of two side or standard portions 15 pivoted at their lower ends to the body in any suitable way, and a neck portion 15ª connecting the outer ends of said side portions. The said bows constitute the supporting or standard members of the frame which comprises also a frame top adapted to be longitudinally extended and collapsed, and is carried by said bows.

The said frame top includes members 18 and 19, jointed together at 20, the members 18 being pivoted at 21 to the front bow, while the members 19 are pivoted at 22 to the rear bow. The members 18 and 19 constitute the rear portion of the frame top and are adapted, when substantially alined with each other as shown by Fig. 1, to maintain the front and rear bows spaced apart. They are also adapted to swing inwardly at their jointed ends when the frame is being collapsed, and to compel the bows to substantially meet when the top is folded.

The frame top, as shown by Figs. 1, 2, 3 and 4, also includes members 24 and 25 jointed together at 26, the members 24 being pivoted at 27 to the front bow. The members 24 and 25 constitute the front portion of the frame top and project forward from the front bow, the members 25 being connected at their outer ends by a cross bar 28 which supports the front end of the cover 12, means being provided as hereinafter described for maintaining said members in substantial alinement with each other when the top is extended.

The side portions 14 of the front bow constitute guides on which runners 30 are movable, said runners being elements of the preferred means provided in accordance with my invention for extending the frame top when the front bow is erected, and for collapsing the frame top when the front bow is depressed or swung backward. Said runners may be sleeves loosely surrounding the side portions or guides 14 and are connected with the body 13 by inflexible rods 32, so arranged that, when the front bow is erected or swung forward and upward from a depressed position, the runners are also automatically swung forward with the bow, and at the same time automatically moved away from the pivoted ends of the bow, and, when the front bow is depressed or swung downward and backward, the runners are also swung automatically downward and backward, and at the same time moved automatically toward the pivoted ends of the bow. The rods 32 are pivoted at 33 to the body and at 34 to the runners, the pivotal points 33 being preferably forward of and spaced from the pivotal joints of the front bow and preferably higher than the center of oscillation of the front bow.

The runners 30 are connected with the frame top members 18 by braces 36 pivoted at 37 to the runners and at 38 to the said members. The runners are connected with the frame top members 24 by braces 39 pivoted at 40 to the runners and at 41 to the members 24. Short links 42 are pivoted at 41 to the members 24 and braces 39, and at 44 to longer links 45 which are pivoted at 46 to the members 25. The links 42 and 45 cooperate with the members 24 and 25 in forming a lazy tongs which automatically extend or project forward the front portion of the frame top when the top is erected, said links also constituting a means for maintaining the members 24 and 25 in substantial alinement when the frame is extended, and for causing said members to automatically fold inwardly when the frame is collapsed. The frame top members 24 and 25 are so constructed that the members 24 support the members 25 against downward movement when the frame top is extended. The cross bars 14ª and 15ª constituting parts of the front and rear bows and the cross bar 28 at the forward end of the frame top constitute the essential transverse supports for the cover 12. If desired, additional cross bars such as 48, 49 and 50 may be provided, these being connected with members of the frame top although they may be omitted if desired.

It will now be seen that, when the front bow is swung forward and upward and thus erected, the runners 30 are forced automatically forward and upward away from the pivotal ends of the bow and move the jointed frame top members automatically into substantial alinement with each other, thus longitudinally extending the frame top, the rear bow being at the same time raised as shown by Fig. 1 and held spaced from the front bow by the members 18 and 19. The frame as a whole may now be confined in its erected and extended position by means provided for that purpose, said means as here shown being set screws or clamps 52 engaged with runners 30 and adapted to be set up against the runner guides thereby clamping the runners to the guides. The forward end of the top may be detachably connected with and supported by the wind shield 53.

To collapse or fold the frame and cover the forward end of the top is detached from the wind-shield, the runners are unfastened as by loosening the clamps 52, and the front bow is depressed or swung backward, this operation causing the runners to move automatically downward on the front bow and toward the pivotal ends thereof, so that the braces 36 and 39 fold the frame top members inwardly as indicated by Fig. 3. While the front bow may be erected and depressed by the application of force directly to it, as through the hands of an operator, I prefer to provide mechanism for that purpose. Said mechanism may be embodied in an arm 55 rigidly connected with the rock shaft as shown by Fig. 2, or with one of the side portions 14 as shown by Fig. 11, a rack bar 56 movable longitudinally in guides in the body 13, a link 57 connecting the arm 55 with the rack bar, and a gear 58 meshing with the rack bar and journaled in bearings in the body. The gear may be turned in either direction by power suitably applied as through a lever 59 arranged to be moved by the chauffeur, and preferably detachably connected with the gear so that it may be stowed away when not required. The lever may act on the gear through a pawl 60 and a ratchet 60ª, so that a step-by-step movement of any desired length may be imparted to the rack bar. It is obvious that power may be derived from the motor of the vehicle, suitable means being provided for engaging the power-transmitting means with and disconnecting it from the motor. In case the rock shaft 16 is employed, said shaft is preferably located in the space under a seat of the vehicle so that it is out of the way, the arm 55 and the connecting parts being similarly located. The trunnions 16ª 16ᵇ constitute an equivalent of the continuous rock shaft 16, hence the term "rock shaft" used in several of the appended claims is to be interpreted as meaning either a continuous rock shaft as shown by Fig. 2, or an interrupted rock shaft as shown by Fig. 11.

As indicated by Fig. 10, the power-applying means may be embodied in gears 61 which may be either continuous or segmental, and are rigidly connected with the side portions 14, and gears 62 meshing with the gears 61, and fixed to a transverse rock shaft 63 which is journaled in fixed bearings on the body and is provided with a crank 63ª whereby it may be turned.

As shown by Fig. 5, a relatively short top may be provided, the braces 39 and the forwardly projecting portion of the frame top being admitted. I prefer, however, in case a short top is provided, to employ the construction shown by Fig. 12, embodying a short forwardly-projecting frame-top portion composed of members 24ª 25ª jointed together at 20ª, the members 24ª being pivoted to the upper ends of the side portions of the front bow 14. The members 25ª are pivoted to the neck portion of a bow, the side portions 66 of which are pivoted to the runners 30 and are connected with the side portions 14 of the front bow by short links 67. When the runners are elevated, the parts assume the extended position shown by Fig. 12. When the top is folded, the downward movement of the runners causes the links 67 to swing toward the side portions 14 thus swinging the bow 66 backwardly toward the side portions 14 and causing the members 24ª and 25ª to fold inwardly. The construction shown by Fig. 12 may be modified to produce a longer top.

Fig. 9 shows a modification of the front portion of the frame top whereby the forward movement of the members 25 may be increased in case the top is of more than usual length. The side portions of the front bow may be slotted so that each forms two parallel runner guides as shown by Figs. 6, 7 and 8, in which 14ᵇ represents the side portions, and 30ᵇ the runners movable in slots 14ᶜ, in the side portions and provided with brace-engaging ears 30ᶜ.

Contractile springs 60, Fig. 5, may be attached at their upper ends to the side portions 14 and at their lower ends to the runners 30, to exert an upward yielding pull on the runners and thus reduce the force required to raise the same, said springs being extended by the force exerted in folding or collapsing the frame, and constituting means counter-balancing the weight of the runners and connected parts.

Fig. 13 shows a modification omitting the runners 30, the rods 32 being pivoted at their upper ends to the frame top members 24.

It is obvious that either of the standard bows may be selected to guide the runners, and that any other suitable means may be provided for causing the runners to move upon their guides and thereby collapse or extend the frame simultaneously with the raising and lowering of the bows. It is also obvious that the raising and lowering force may be applied in either of the standard bows, and, if desired, to the rod 32 as indicated by Fig. 12.

The provision of two bows front and rear, the application of force to the front bow, and its selection to bear the runners are matters of convenience only.

The rods 32 are not necessarily pivoted directly to the body, but, as shown by Fig. 12, may be pivoted at 67 to a movable support such as the rack bar 56, in which case the runners would be raised by a backward movement of the rack bar, and lowered by a forward movement thereof, the rods being pivoted at points which are horizontally movable and vertically immovable, because the rack-bar slides horizontally and is confined by suitable guiding means against vertical movement. It is obvious that the same result may be accomplished by various other means.

What I claim is:—

1. An improvement in tops for vehicle bodies comprising bows having means whereby they may be pivotally supported, a longitudinally extensible and collapsible frame top provided with jointed members movably connected to said bows, rigid operating rods each having means at one end whereby it may be pivotally supported in spaced relation to the pivots of said bows, and means for slidably connecting the other ends of the operating rods with one of said bows, and brace members connecting the frame top with said operating rods, whereby the frame top will be expanded and collapsed by swinging movements of one of said bows.

2. An improvement in tops for vehicle bodies comprising bows having means whereby they may be pivotally supported, a longitudinally extensible and collapsible frame top provided with jointed members movably connected to said bows, rigid operating rods each having means at one end whereby it may be pivotally supported in spaced relation to the pivots of said bows, and runners slidably mounted upon one of said bows and connected with the other ends of the operating rods, brace members connecting the frame top with said operating rods, whereby the frame top will be expanded and collapsed by swinging movements of the last mentioned bow.

3. An improvement in tops for vehicle bodies comprising bows having means whereby they may be pivotally supported, a longitudinally extensible and collapsible frame top provided with jointed members movably connected to said bows, rigid operating rods each having means at one end whereby it may be pivotally supported in spaced relation to the pivots of said bows, runners slidably mounted upon one of said bows and connected with the other ends of the operating rods, brace members connecting the frame top with said operating rods, whereby the frame top will be expanded and collapsed by swinging movements of the last mentioned bow, and means whereby the runners may be held against sliding movement.

4. An improvement in tops for vehicle bodies comprising bows having means whereby they may be pivotally supported, a longitudinally extensible and collapsible frame top provided with jointed members movably connected to said bows, rigid operating rods each having means at one end whereby it may be pivotally supported in spaced relation to the pivots of said bows, runners slidably mounted upon one of said bows and connected with the other ends of the operating rods, and braces pivoted to said runners and to said frame top to maintain the latter in extended relation, whereby the frame top will be expanded and collapsed by swinging movements of the last mentioned bow.

5. An improvement in tops for vehicle bodies comprising bows having means whereby they may be pivotally supported, a longitudinally extensible and collapsible frame top provided with jointed members movably connected to said bows, rigid operating rods each having means at one end whereby it may be pivotally supported in spaced relation to the pivots of said bows, means for slidably connecting the other ends of the operating rods with one of said bows, and brace members connecting the frame top with said operating rods, whereby the frame top will be expanded and collapsed by swinging movements of one of said bows, and means for counterbalancing the weight of said frame top.

6. An improvement in tops for vehicle bodies comprising bows having means whereby they may be pivotally supported, a longitudinally extensible and collapsible frame top provided with jointed members movably connected to said bows, rigid operating rods each having means at one end whereby it may be pivotally supported in spaced relation to the pivots of said bows, runners slidably mounted upon one of said bows and connected with the other ends of the operating rods, brace members connecting the frame top with said operating rods, whereby the frame top will be expanded and collapsed by swinging movements of the last mentioned bow, and contractile springs attached to the last mentioned bow and said runners and positioned to exert a yielding upward pull on the runners.

7. An improvement in tops for vehicle bodies comprising bows having means whereby they may be pivotally supported, jointed frame top members forming a longitudinally extensible and collapsible rear frame top portion pivoted to said bows and adapted to maintain the bows in spaced relation, jointed members forming longitudinally extensible and collapsible forward frame top portions pivotally connected with said bows, rigid operating rods each having means at one end whereby it may be pivotally supported in spaced relation to the pivots of said bows, runners slidably mounted on one of said bows and connected with the other ends of the operating rods, and means for connecting said runners with said frame top portions.

8. In combination, a vehicle body, a flexible cover, a frame supporting said cover and adapted to be erected with the cover above the body and folded with the cover behind the body, said frame including an oscillatory bow, a rock-shaft attached to said bow and journaled in bearings in the body, said rock-shaft constituting a pivotal connection between the bow and the body, means for turning said rock-shaft to swing the bow, inflexible rods pivoted to swing relatively to the body at points which are spaced from the pivots of the bow, runners slidable on the bow and pivoted to said rods, said runners being automatically movable to their operative position on the bow by a forward swinging movement of the latter, and devices for securing the runners to the bow to confine the bow in an erected position.

9. In combination, a vehicle body, a flexible cover, a frame supporting said cover and adapted to be erected with the cover above the body and folded with the cover behind the seating space of the body, said frame including swinging bows pivoted to the body, and jointed members of a longitudinally extensible and collapsible frame top pivoted to said bows and adapted to maintain the bows spaced apart when the frame is erected, and frame-top-extending, confining, and collapsing means operable by the erection and depression of the frame to extend and collapse the frame top, said means including inflexible rods pivoted to swing relatively to the body at points which are spaced from the pivots of the bow, and slidably connected with one of said bows, said rods being movable, by force applied to one of said bows, to automatically extend and collapse the frame top.

10. In combination, a vehicle body, a flexible cover, a frame supporting said cover and adapted to be erected with the cover above the body and folded with the cover behind the seating space of the body, said frame including swinging front and rear bows pivoted to the body and jointed members of a longitudinally extensible and collapsible frame top pivoted to said bows and adapted to maintain the bows spaced apart when the frame is erected, said jointed members constituting the rear portion of the frame top, and a front frame top portion pivoted to the front bow and projecting forward therefrom when the frame top is extended, said front portion including jointed members, and frame-top-extending, confining, and collapsing means operable by the erection and depression of the frame to extend and collapse the frame top, said means including runners slidable on the standard portions of one of the bows and provided with devices whereby they may be fixed to said standard portions, connections between said runners and the said rear and front frame top portions, and inflexible rods pivoted at their outer ends to the runners, and at their inner ends pivoted to swing relatively to the body at points which are spaced from the pivots of the bow, the runners being automatically movable to their operative position on said standards through said rods by a forward swinging movement of said bow.

11. In combination, a vehicle body, a flexible cover, a frame supporting said cover and adapted to be erected with the cover above the body and folded with the cover behind the seating space of the body, said frame including swinging bows pivoted to the body, and jointed members of a longitudinally extensible and collapsible frame top pivoted to said bows and adapted to maintain the bows spaced apart when the frame is erected, the side portions of one of said bows constituting runner guides, runners slidably mounted on said guides, braces pivoted to said runners and to members of said frame top, and means connected with said runners for causing frame-top-extending and collapsing movements of the runners on their guides.

12. In combination, a vehicle body, a flexible cover, a frame supporting said cover and adapted to be erected with the cover above the body and folded with the cover behind the seating space of the body, said frame including swinging bows pivoted to the body, and jointed members of a longitudinally extensible and collapsible frame top pivoted to said bows and adapted to maintain the bows spaced apart when the frame is erected, frame-top-extending and collapsing means connecting the frame top with the body and operable by the erection and depression of the frame to extend and collapse the frame top, said means including runners slidable on the standard portions of one of the bows and provided with devices whereby they may be fixed to said standard portions, connections between said runners and the said rear and front frame top portions, and inflexible rods pivoted at their outer ends to the runners, and at their inner ends pivoted to swing relatively to the body at points which are spaced from the pivots of the bow, the runners being automatically movable to their operative position on said standards through said rods by a forward swinging movement of said bow, and means carried by the body for swinging one of said bows to erect and collapse the frame.

13. In combination, a vehicle body, a flexible cover, a frame supporting said cover and adapted to be erected with the cover above the body and folded with the cover behind the seating space of the body, said frame including swinging bows pivoted to the body, and jointed members of a longitudinally extensible and collapsible frame top pivoted to said bows and adapted to maintain the bows spaced apart when the frame is erected, frame-top-extending and collapsing means connecting the frame top with the body and operable by the erection and depression of the frame to extend and collapse the frame top, said means including runners slidable on the standard portions of one of the bows and provided with devices whereby they may be fixed to said standard portions, connections between said runners and the said rear and front frame top portions, and inflexible rods pivoted at their outer ends to the runners, and at their inner ends pivoted to swing relatively to the body at points which are spaced from the pivots of the bow, the runners being automatically movable to their operative position on said standards through said rods by a forward swinging movement of said bow, a rockshaft journaled on the body and rigidly connected with one of said bows, and means carried by the body for turning said rockshaft to erect and collapse the frame.

14. In combination, a vehicle body, a flexible cover, a frame supporting said cover and adapted to be erected with the cover above the body and folded with the cover behind the seating space of the body, said frame including swinging bows pivoted to the body, and jointed members of a longitudinally extensible and collapsible frame top pivoted to said bows and adapted to maintain the bows spaced apart when the frame is erected, frame-top-extending and collapsing means connecting the frame top with the body and operable by the erection and depression of the frame to extend and collapse the frame top, said means including runners slidable on the standard portions of one of the bows and provided with devices whereby they may be fixed to said standard portions, connections between said runners and the said rear and front frame top portions, and inflexible rods pivoted at their outer ends to the runners, and at their inner ends pivoted to swing relatively to the body at points which are spaced from the pivots of the bow, the runners being automatically movable to their operative position on said standards through said rods by a forward swinging movement of said bow, a rock-shaft journaled on the body and rigidly connected with one of said bows, said rock-shaft having an arm, a rack-bar carried by the body and movable lengthwise thereof, a gear carried by the body and meshing with said rack-bar, and means for turning said gear to move the rack-bar, said means having provisions for moving the rack-bar step by step.

15. A top frame for vehicle bodies comprising bows adapted to be pivotally connected to a body, and jointed frame-top members supported by and connecting said bows, combined with means adapted to coöperate with said bows, and frame-top members and with a vehicle body to longitudinally extend the frame top when the bows are erected, and to fold the frame as a whole when the bows are depressed, said means including jointed frame-top members and links coöperating therewith to form lazy-tongs; and inflexible rods pivoted to swing relatively to the body at points which are spaced from the pivots of the bow, means for slidably connecting said rods and one of said bows, and connections between said rods and members of said lazy-tongs.

16. A top frame for vehicle bodies comprising bows adapted to be pivotally connected to a body, and jointed frame-top members supported by said bows, combined with means adapted to coöperate with said bows and frame-top members and with a vehicle body to longitudinally extend the frame top when the bows are erected, and to fold the frame as a whole when the bows are depressed, said means including jointed frame-top members and links coöperating therewith to form lazy-tongs, and inflexible rods pivoted to swing relatively to the body at points which are spaced from the pivots of the bow, means for slidably connecting said rod and one of said bows, connections between said rods and members of said lazy-tongs, and manually operable devices for confining the frame in its erected and folded positions.

17. A top frame for vehicle bodies, comprising bows adapted to be pivotally connected to a body, and jointed frame-top members supported by said bows, combined with runners movable on one of said bows, braces connecting said runners with members of the frame-top, and inflexible rods pivoted to said runners and adapted to be pivotally engaged with a body, said rods being movable by force applied to one of said bows to automatically move the runners on said bow.

18. A top frame for vehicle bodies, comprising standard members adapted to be pivotally connected to a body, and jointed frame-top members supported by said standard members, combined with runners movable on one of said standard members, braces connecting said runners with members of the frame-top, and inflexible rods pivoted to said runners and adapted to be pivotally engaged with a body and to cause automatic movement of the runners to their operative position, said runners being provided with manually operable devices whereby they may be secured to confine the frame in its erected and folded positions.

19. A top frame for vehicle bodies, comprising standard members adapted to be pivotally connected to a body and a frame top composed of jointed members pivoted to said standard members and including rear and front portions, combined with runners movable on and guided by one of said standard members, inflexible rods pivoted to said runners and adapted to be pivotally engaged with a body and to cause automatic movement of the runners to their operative position, said runners being provided with manually operable devices whereby they may be secured to confine the frame in its erected and folded positions, a bow pivoted to said runners and to members of the frame-top portion, and links connecting said bow with the runner-guiding standard member.

In testimony whereof I have affixed my signature.

SIMON MYERSON.

Copies of this patent may be obtained for five cents each, by addressing the "Commissioner of Patents, Washington, D. C."